US011291224B2

(12) United States Patent
Avashia et al.

(10) Patent No.: US 11,291,224 B2
(45) Date of Patent: Apr. 5, 2022

(54) METHODS FOR MAKING FLOUR-BASED FOOD PRODUCTS AND FOOD PRODUCTS MADE THEREBY (71) Applicant: Tate & Lyle Ingredients Americas, LLC, Hoffman Estates, IL (US)

(72) Inventors: Sanjiv H. Avashia, Streamwood, IL (US); Melissa Kirby Riddell, South Elgin, IL (US)

(73) Assignee: Tate & Lyle Ingredients Americas LLC, Hoffman Estates, IL (US)

( * ) Notice: Subject to any disclaimer, the term of this patent is extended or adjusted under 35 U.S.C. 154(b) by 281 days.

(21) Appl. No.: 15/303,159

(22) PCT Filed: Apr. 10, 2015

(86) PCT No.: PCT/US2015/025425
§ 371 (c)(1),
(2) Date: Oct. 10, 2016

(87) PCT Pub. No.: WO2015/157702
PCT Pub. Date: Oct. 15, 2015

(65) Prior Publication Data
US 2017/0027200 A1    Feb. 2, 2017

Related U.S. Application Data

(60) Provisional application No. 61/978,740, filed on Apr. 11, 2014.

(30) Foreign Application Priority Data

Jun. 19, 2014  (GB) ..................................... 1410909

(51) Int. Cl.
A23L 7/13      (2016.01)
A21D 8/02      (2006.01)
A21D 2/18      (2006.01)

(52) U.S. Cl.
CPC ................ *A23L 7/13* (2016.08); *A21D 2/186* (2013.01); *A21D 8/02* (2013.01); *A23V 2002/00* (2013.01)

(58) Field of Classification Search
None
See application file for complete search history.

(56) References Cited

U.S. PATENT DOCUMENTS 3,404,986 A    10/1968    Wimmer et al.
6,001,409 A *  12/1999    Gimmler .................. A23L 7/13
                                                            426/549

(Continued)

FOREIGN PATENT DOCUMENTS

EP           0 324 460           7/1989

*Primary Examiner* — Lien T Tran
(74) *Attorney, Agent, or Firm* — McDonnell Boehnen Hulbert & Berghoff LLP (57) ABSTRACT

The disclosure provides an improved process for making flour-based food products that have a final moisture content of less than 3%. In particular, the process comprises preparing uncooked dough from at least flour, starch, and water, heat-pressing the uncooked dough to form a heat-pressed dough sheet, and cooking the hot-pressed dough sheet to form a food product that has a final moisture content of less than about 3%. Advantageously, the food products can maintain a light, bubbly, and crisp texture with rapid mouth-melt.

25 Claims, 3 Drawing Sheets

(56) References Cited

U.S. PATENT DOCUMENTS

| | | | | |
|---|---|---|---|---|
| 7,897,191 B2* | 3/2011 | Kelly | .................. | A21D 2/36 |
| | | | | 426/439 |
| 2002/0018837 A1 | 2/2002 | Lanner et al. | | |
| 2005/0025862 A1* | 2/2005 | Morad | .................. | A21D 13/10 |
| | | | | 426/94 |
| 2008/0032006 A1 | 2/2008 | Villagran et al. | | |
| 2011/0183059 A1* | 7/2011 | Stanton | .................. | A21D 2/18 |
| | | | | 426/552 |
| 2012/0263854 A1* | 10/2012 | Chedid | .................. | A21D 2/02 |
| | | | | 426/551 |

\* cited by examiner

METHODS FOR MAKING FLOUR-BASED FOOD PRODUCTS AND FOOD PRODUCTS MADE THEREBY

CROSS-REFERENCE TO RELATED APPLICATIONS

This application is a U.S. national phase application of International Patent Application no. PCT/US2015/025425 filed on Apr. 10, 2015. International Patent Application no. PCT/US2015/025425 claims the priority of U.S. Provisional Patent Application no. 61/978740, filed Apr. 11, 2015, and UK Patent Application no. 1410909.4 filed Jun. 19, 2014, each of which is hereby incorporated herein by reference in its entirety.

BACKGROUND OF THE INVENTION

Field of the Invention

This disclosure relates generally to methods for making food products. More specifically, this disclosure relates to methods for making flour-based (e.g., corn masa, wheat flour) pressed food products.

Description of Related Art

A wide variety of flour-based food products, such as corn chips, tortillas, puffed dough articles, potato crisps, cookies, and crackers, among others, are currently available to customers for food consumption. These flour-based food products are frequently made from corn, wheat, potato or other starch-containing ingredients. Traditionally, such food products are first shaped, then fried and/or baked into a variety of forms.

There are a number of factors that customers consider when evaluating the desirability of flour-based food products. Some of those factors include, but are not limited to, taste, texture, size, visual appeal, nutritional value, and price, among others. As such, flour-based food products are produced in a wide variety of shapes, textures, tastes and made with varying ingredients and cooking techniques in order to appeal to a wide variety of customers.

For example, wheat flour tortillas (e.g., as used in burritos and quesadillas) are typically heat pressed prior to baking. Tortillas are baked so that they retain significant amounts of moisture, so that they remain flexible for wrapping and folding.

Snack chips and crisps, on the other hand, are typically cut into pieces in uncooked dough form, and then baked or fried to low moisture content (i.e., less than about 3%), desirably to provide crispy or crunchy chips or crisps. For example, tortilla chips are traditionally made by forming an uncooked dough, known as masa, into sheets, then baking the sheets to reduce the moisture content to from about 20% to about 35%. The baked snack pieces are then fried in hot oil to form tortilla chips having a moisture content of less than about 3%.

While such methods can be useful in making flour-based food products, the consumer market constantly demands improved taste and texture in its food products. Production of flour-based food products that have a final moisture content of less than 3% and use native starch, while maintaining a light, bubbly, and crisp texture with rapid mouth melt, still presents a challenge. Accordingly, there remains a need for improved methods for making flour-based food products.

SUMMARY OF THE INVENTION

In one broad aspect, the disclosure provides methods for making a food product including:

providing an uncooked dough including:
   about 20% to about 60% flour;
   about 0.5% to about 50% starch; and
   about 20% to about 60% water;
heat-pressing the uncooked dough to form a heat-pressed dough sheet; and
cooking the heat-pressed dough sheet to form the food product, the food product having a moisture content of less than about 3%.

In another aspect, the disclosure provides food products made by the methods described herein.

The processes and food products described herein can enjoy a number of advantages. For example, many conventional processes for producing crisp flour-based food products require the use of pregelatinized flour during the dough production step. In certain embodiments of the methods and food products described herein, uncooked flour can be used in the dough without the need for gelatinization prior to the dough production. While not intending to be bound by theory, the present inventors surmise that in certain aspects of the methods described herein, the heat-pressing provides substantial gelatinization of ungelatinized or partially-gelatinized starch present in the dough (e.g., as a component of the flour and/or as part of the added starch). Accordingly, the methods described herein can advantageously increase the type of flours and starches available for use in the production of flour-based food products, while providing desirable texture and taste.

DETAILED DESCRIPTION OF THE INVENTION

Before the disclosed methods and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value.

When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

In view of the present disclosure, the processes described herein can be configured by the person of ordinary skill in the art to meet the desired need. In general, the disclosed methods and materials provide improvements for producing a novel flour-based food product by providing an uncooked dough comprised of at least water, flour, and starch, heat-pressing the uncooked dough to form heat-pressed dough, and cooking the heat-pressed dough to form a food product having a moisture content of less than about 3%.

As described above, one step in the methods described herein is the provision of an uncooked dough. As the person of ordinary skill will appreciate, the provision of the uncooked dough may be performed through a variety of methods. Premade uncooked doughs can be used, or the uncooked dough can be mixed as needed. The person of ordinary skill in the art will recognize that a variety of techniques can be used to prepare the uncooked dough. For example, in one example of a method for preparing the uncooked dough, the dry ingredients are first mixed together, then the wet ingredients are added to the mixture and mixing is continued for a desired period of time. As the person of ordinary skill in the art will appreciate, and as further discussed below, a number of variables may be adjusted to alter the characteristics of the uncooked dough itself for use in the methods described herein.

As the person of ordinary skill in the art, the term "uncooked" with respect to the dough means that the dough itself has not yet been cooked, i.e., after it has been formed. The person of ordinary skill in the art will appreciate that the uncooked dough may itself include components that have been previously cooked, e.g., when being processed.

The amount of starch, water, and flour in the uncooked dough may vary based on the desired type of flour-based food product. In certain embodiments of the invention as described herein, the amount of flour in the dough may range from, but is not limited to, about 20% to about 60% of the weight of the uncooked dough. For example, in one embodiment of the invention as described herein, the amount of flour in the uncooked dough ranges from about 25% to about 45% of the weight of the dough. In other embodiments, the amount of flour in the uncooked dough ranges from about 20% to about 50%, from about 25% to about 60%, from about 30% to about 60%, or from about 30% to about 50% of the weight of the dough.

In certain embodiments of the invention as described herein, the amount of starch in the uncooked dough may range from, but is not limited to, about 0.5% to about 50% of the weight of the uncooked dough. For example, in one embodiment of the invention as described herein, the amount of starch ranges from about 1% to about 35%. In yet another embodiment, the amount of starch in the uncooked dough may range from about 2% to about 15% weight of the uncooked dough. In other embodiments, the amount of starch in the uncooked dough ranges from about 0.5% to about 35%, from about 0.5% to about 20%, from about 0.5% to about 15%, from about 0.5% to about 10%, from about 1% to about 20%, from about 1% to about 15%, from about 1% to about 10%, from about 2% to about 35%, from about 2% to about 20%, from about 2% to about 15%, from about 2% to about 10%, from about 4% to about 35%, from about 4% to about 20%, from about 4% to about 15%, or from about 4% to about 10% of the weight of the uncooked dough. As used herein, and as the person of ordinary skill in the art will appreciate, this starch component of the uncooked dough is separate from the starch that is present as a component of the flour itself.

In certain embodiments of the invention as described herein, the amount of water in the uncooked dough may range from, but is not limited to, about 20% to about 60% of the weight of the uncooked dough. For example, in one embodiment of the invention as described herein, the amount of water in the uncooked dough ranges from about 25% to about 50% of the weight of the uncooked dough. In other embodiments, the amount of water in the uncooked dough ranges from about 30% to about 60%, from about 30% to about 50%, from about 30% to about 45%, from about 25% to about 60%, from about 25% to about 45%, from about 25% to about 40%, from about 20% to about 55%, from about 20% to about 45%, or from about 20% to about 40% of the weight of the uncooked dough.

Further, as the person of ordinary skill in the art will appreciate, the ratio between the flour and the water may vary based on the desired type of flour-based food product. In certain embodiments, the ratio between the amount of water and the amount of flour in the uncooked dough may range from about 3:1 to about 1:3. For example, in certain embodiments, the ratio between the amount of water and the amount of flour in the uncooked dough ranges from about 2:1 to about 1:2, or from about 3:2 to about 2:3. Similarly, the ratio between the amount of water and the total amount of flour and starch may vary based on the desired type of flour-based food product. In certain embodiments, the ratio between the amount of water and the total amount of flour and starch in the dough may range from about 3:1 to about 1:3. For example, in certain embodiments, the ratio between the amount of water and the total amount of flour and starch in the uncooked dough ranges from about 2:1 to about 1:2, or from about 3:2 to about 2:3.

Certain particular embodiments of the composition of the uncooked dough are described herein with respect to the type of flour used to produce the uncooked dough. In particular, the type of flour used to produce the uncooked dough may vary based on the type of flour-based food product desired. Types of flour may include but are not limited to, corn flour (e.g., in the form of masa), cereal flours (e.g., whole grain flours, bran flours, rice flours, wheat flours, spelt flours, barley flours, rye flours, oat flours), legume flours (e.g., bean flours, lentil flours), among others. Thus, in certain embodiments of the methods as described herein, the flour includes, or consists essentially of, corn flour (e.g., in the form of masa). In certain embodiments of the methods as described herein, the flour includes, or consists essentially of, wheat flour (e.g., white flour, whole wheat flour). In certain embodiments of the methods as described herein, the flour includes, or consists essentially of, rice flour. The person of ordinary skill in the art will understand that other types of flour may be acceptable as well. And as described further below, cereal grains, legumes, potatoes and other vegetable matter can be included in other forms, such as flakes, meal and grits, having varying particle sizes and shapes.

In one embodiment, the flour may comprise corn flour, for example, in the form of corn masa flour. Typically, corn masa flour is produced by drying whole corn grains and soaking and cooking the mature grains in a solution of lime, otherwise known as calcium hydroxide, or wood ash. This process is commonly known as nixtamalization. This process aids in the ability for the corn masa flour to absorb water, thus allowing dough formation to occur. Other processes for producing corn masa flour may be possible as well. As the person of ordinary skill in the art will appreciate, the corn masa flour may be provided as a dried flour, or may be provided together with some of the water of the formulation in the form of corn masa.

In certain embodiments, the flour used to produce the uncooked dough may include a combination of different kinds of flours. For example, in certain embodiments, corn masa flour is combined with one or more cereal flours, such as rice flour or wheat flour. Other combinations may exist as well.

In certain embodiments of the methods described herein, one or more of the flours used to produce the uncooked dough may be gelatinized (i.e., before it is formulated into the uncooked dough). For the purposes of describing the invention, but without intending any limitation through such description, gelatinization is the process by which starch granules lose their crystallinity in presence of moisture, heat, and/or shear, causing them to swell. The flour may be substantially gelatinized, or only partially gelatinized. But in other embodiments, one or more of the flours is raw flour, i.e., it has not yet been gelatinized when it is incorporated into the uncooked dough. As will be described below, the heat-pressing process can allow ungelatinized or partially-gelatinized flours to become more fully gelatinized. Moreover, as will be described below, the heat-pressing can allow the gelatinized starch to break down into fragments, often termed "pasting".

Certain particular embodiments of the composition of the uncooked dough are described herein with respect to the type of starch used in the uncooked dough. In particular, the type of starch used in the uncooked dough may vary based on the type of flour-based food product desired. Types of starch may include, but are not limited to native starch, modified starch, pre-gelatinized starch, pre-gelatinized-waxy starch, and a cold-water swelling starch, among others. Further, the starch may be produced from corn (e.g., waxy corn), tapioca, potato, wheat or rice, among other sources.

In certain embodiments, the uncooked dough includes native starch, i.e., starch present in its most natural form—as it occurs in the plant. In certain embodiments of the invention as described herein, MERIZET® brand starch, a native starch made by Tate & Lyle, is used in the production of the uncooked dough, for example, to help provide crispy texture in a wide variety of flour-based food products. The use of native starch, as further discussed below, is made more advantageous (e.g., for contributions to texture and/or flavor) by the heat-pressing processes described herein.

In certain embodiments, the starch used to produce the uncooked dough may be modified starch, which may be prepared by physically, enzymatically, or chemically treating native starch, resulting in a modified version of the starch. Modified starches are modified in a variety of fashions to improve food quality and performance. For example, modified starches may allow for less gelling, more stability, and greater water retention as compared to unmodified starches. Examples of modified starches include, but are not limited to: acid-treated starch, roasted starch with hydrochloric acid (dextrin), alkaline-modified starch, bleached starch, oxidized starch, enzyme-treated starch, monostarch phosphate, distarch phosphate, acetylated starch, hydroxypropylated starch, hydroxyethyl starch, starch sodium octenyl succinate, starch aluminum ocetenyl succinate, cationic starch, carboxymethylated starch, among others. As used herein, modified starches may also or alternatively be modified through physical, as opposed to chemical, modification, for example, by partially cooking the starch (e.g., as in instant starches).

In certain embodiments of the invention as described herein, the starch is a cook-up starch, an instant starch, a cold-water swelling starch, or a pre-gelatinized starch. Such starches may be prepared from corn, waxy corn, potato, or tapioca to provide unique functionality in the production of food products. For example, the addition of such starches can help bind together the flour with other ingredients that may be present in the uncooked dough. Further, such starches can act to thicken and stabilize food products, enhance texture in baked goods, extend shelf-life in frozen foods, increase viscosity, and provide a smooth glossy appearance. Other starch varieties may be used as well.

In certain aspects, the following starches, identified by Tate & Lyle brand name, are preferred: RESISTAMYL™, STA-SLIM®, MIRA-GEL®, MERIGEL™, X-PAND'R®, MIRA-THIK®, MIRA-SPERSE®, TENDER-JEL®, TENDERFIL®, MAXIMAIZE®, REZISTA®, DURA-JEL®, LO-TEMP®, REDI-TEX®, SOFT-SET®, REDISOL®, and TAPIOCA Dextrins. For example, in certain embodiments of the invention as described herein, the starch is selected from one or more starches available under the designations X-PAND'R® 612, X-PAND'R® SC, X-PAND'R®, X-PAND'R® 683, MERIGEL™301, MERIGEL™ 100, MERIGEL™ 300, and MIRA-GEL® 463. Specifically, in certain embodiments, one or more starches available under the trade name X-PAND'R® is present in the uncooked dough, for example, to help provide crispy and/or crunchy textures, in addition to clean-label benefits.

In certain embodiments of the invention as described herein, the starch in the dough includes of a combination of modified and native starches. In certain embodiments, the uncooked dough may include a pre-gelatinized starch and a cook-up starch. Additionally, in certain embodiments of the invention as described herein, the starch in the dough includes a combination of starch varieties.

In certain embodiments of the invention as described herein, the uncooked dough may contain an emulsifier, e.g., in an amount in the range of about 0.05% to about 2% of the weight of the dough. An emulsifier can be used to help condition the dough such that it is easier to handle and has an improved finished texture. A variety of emulsifiers may be used, including, but not limited to, lecithin, monoglycerides, diglycerides, a polysorbate, calcium stearoyl-2-lactylate, lactylic stearate, sodium stearoyl fumarate, succinylated monoglyceride, or sodium stearoyl-2-lactylate, alone or in combination.

In certain embodiments of the invention as described herein, the uncooked dough may contain a leavening agent, e.g., in the amount in the range of about 0.01% to about 2% of the weight of the dough. A variety of leavening agents may be used, including, but not limited to, sodium bicarbonate (baking soda), sodium carbonate, baking powder, ammonium carbonate, ammonium bicarbonate, yeast, baker's yeast, active dried yeast, baking soda, potassium bitartrate (cream of tartar), potassium carbonate, potassium bicarbonate, or dipotassium carbonate, alone or in combination.

In certain embodiments of the invention as described herein, the uncooked dough may contain a particulate, for example, in the amount up to about 10% (e.g., about 1% to about 5%) of the weight of the dough. This particulate may be, for example, in the form of meal or grits, and can be from the same source as the flour used in the dough (e.g., corn grits with corn flour); or a different source than the flour used in the dough (e.g., crushed wheat berries with corn flour). A variety, or combination, or particulates may be used, including, but not limited to, corn meal, rice meal, or seminola. In certain embodiments, the size of the particulate (i.e., average diameter) may range from about 300 micrometers to about 1800 micrometers (as compared to flour, which in certain embodiments will have an average particle diameter less than about 100 micrometers). The use of particulates can help suppress excessive bubbles and/or blisters when the heat-pressed dough sheet is cooked to provide the food product. Larger particulates may, for example, be prehydrated in water prior to inclusion in the dough to help ease the heat pressing step.

As the person of ordinary skill in the art will appreciate, additional ingredients may be present in the uncooked dough mixture, for example, to enhance flavor, texture or processability. Examples of such additional ingredients may include, but are not limited to, dehydrated potato product (e.g., potato flakes), isolated potato product, bean material (such as bean flakes), lentil material (such as lentil flakes), whole grain material, bran material, nuts, seeds, and other vegetable material (e.g., spinach powder, pepper flakes); proteinaceous materials (e.g., dairy and vegetable protein ingredients, flours, powders, flakes). As the person of ordinary skill in the art will appreciate, the additional material may take a variety of other forms. Such additional ingredients may be present in the dough, for example, in an amount up to about 10%, up to about 20%, or even up to about 30% of the weight of the dough.

Of course, as the person of ordinary skill in the art will appreciate, the dough may also include other components such as sugar, salt, flavorings, herbs, spices and fats such as oil, lard, butter or shortening. In particular, these additional components may be added to the dough in an amount, for example, up to about 5%, up to about 10%, up to about 20%, or even up to about 30% of the weight of the dough.

As the person of ordinary skill in the art will appreciate, so-called "clean label" and/or non-GMO materials can be used in the dough. For example, the starch used could be an enzyme- and/or heat and moisture-treated starch.

In certain embodiments, dough temperature may impact the consistency of the dough and ability for the dough to absorb water. Dough that is produced at lower temperature has increased water absorption. The difference in water absorption may play a role in how malleable the resulting dough is. In certain aspects, the dough may be produced at a temperature of between about 75° F. and 85° F. Additionally, the temperature of the water added to the mixture to create the uncooked dough may be modified based on the desired food product. For example, the temperature of the water may impact the degree of water absorption by the starch and the flour. In a certain aspect, the temperature of the water (i.e., when it is added to dry ingredients to form a dough) may range from about 60° F. to about 90° F. In a preferred embodiment, the temperature of the water may range from about 75° F. to about 85° F.

The uncooked dough may be provided in a number of forms. For example, in certain embodiments, the uncooked dough is pre-formed into a sheet before it is heat pressed. The sheet may have the thickness dimension desired for the final product, or it may be somewhat thicker. For example, in one embodiment, the uncooked dough is formed into an uncooked dough sheet having a thickness in the range of about 0.5 mm to about 4 mm. In other embodiments, the uncooked dough is formed into an uncooked dough sheet having a thickness in the range of about 0.7 mm to about 3.5 mm, about 0.9 mm to about 1.8 mm, about 0.9 mm to about 2.5 mm, about 0.5 mm to about 1.8 mm, or about 1 mm to about 3.7 mm. The person of ordinary skill in the art can use standard sheeting methods to provide an uncooked dough sheet. Alternatively, the uncooked dough can be provided in the form of a ball, or a piece having a different shape. In certain such embodiments, the heat pressing step can be used to further thin the dough into a sheet shape.

A number of methods are disclosed for heat-pressing the uncooked dough in order to form a heat-pressed dough sheet. During the process of heat-pressing, the uncooked dough is in a confined environment (e.g., within a heat-press apparatus). While not intending to be bound by theory, when the heated components (e.g., one or more plates and/or rollers) of the heat-press apparatus contact the uncooked dough, a rapid hydration and swelling of starch granules occurs resulting in a significant increase in gelatinization and a rupture of starch granules (depending on the characteristics of the starch in the dough composition). Protein denaturation can also occur during the heat-pressing process in addition to starch gelatinization.

Heat-pressing differs from the conventional baking process, which requires extended residence time at baking temperatures of about 250° F. to about 450° F. in the absence of a pressure and the absence of a confined environment. Under the conventional baking process, ungelatinized or partially-gelatinized starch granules do not have the opportunity for a substantially complete gelatinization due to absence of pressure and shear. Thus, the heat-pressing technology allows the starch granules (i.e., present in the flour and in any not-substantially gelatinized starches used in the dough) to have rapid access to the moisture inside the dough in order to undergo more complete gelatinization. The heat-pressing process can also allow the gelatinized starch to break down into fragments, often termed "pasting". These effects as well as other phenomena in the heat-pressing process can lead to a number of advantages. For example, the heat-pressing can cause the dough to become more cohesive, less sticky, and easier to handle in further processing. The heat-pressing can also help to develop beneficial flavors, appearances and textures in the food product.

A person with ordinary skill in the art will appreciate that a variety of heat-press apparati may be used to heat-press the uncooked dough. For example, the heat-pressing step may be conducted by pressing the uncooked dough with heat between two plates (e.g., between two heated plates). Each plate may be capable of heating to a desired temperature; or in other embodiments only one of the plates is capable of being heated. Tortilla presses can be suitable for use in the hot pressing step. One example of a suitable tortilla press is the Mini Wedge Flour Tortilla Press, available from BE&SCO Manufacturing. Another example is the model no. D-TXM-2-18, available from doughXpress, a division of HIX. Alternatively, the heat-pressing step may be conducted by feeding the uncooked dough through one or more heated rollers. Each roller may be capable of heating to a desired temperature, or in other embodiments only one of the rollers is capable of being heated.

The desired temperature of the heat plates may vary based on the composition of the dough, including, but not limited to, the source of the starch, the amylose and amylopectin ratio within the starch, the type of modification performed on the added starch, the type of flour used in the uncooked dough, the moisture level of the uncooked dough, and the thickness of the dough sheet. For example, in certain embodiments of the invention as described herein, the heat-pressing may be conducted at a plate or roller temperature in the range of 250° F. to about 500° F., e.g., about 250° F. to about 450° F., about 300° F. to about 500° F., about 350° F. to about 500° F., or about 350° F. to about 450 ° F. As the person of ordinary skill in the art will appreciate, other temperatures may also be used, depending on the composition and temperature of the dough and the pressure and residence time of the dough in the heat pressing step.

Further, the amount of pressure applied by the heat-pressing apparatus may have a significant impact on the outcome of the heat-pressed dough sheet. In certain embodiments, the pressure range is from about 15 psi to about 50 psi, e.g., from about 15 psi to about 40 psi, or about 20 psi to about 50 psi. One of ordinary skill in the art may appreciate that the pressure range may vary depending on the composition and temperature of the dough and the temperature and residence time of the dough in the heat pressing step on the characteristics of the uncooked dough.

Additionally, the amount of time that the uncooked dough is heat-pressed can be varied based on the composition of the dough. For example, dough sheet that contains a higher water content may require heat-pressing for a longer period of time. As the person of ordinary skill in the art will appreciate, the time necessary for substantial gelatinization will also depend on the pressure and temperature of the heat pressing step. In one embodiment, the dough sheet may be heat pressed for a time in the range of about 0.1 seconds to about 10 seconds. In other embodiments, the dough sheet may be heat pressed for a time in the range of about 0.1 seconds to 2 seconds. The person of ordinary skill in the art can, in certain embodiments, control the time (as well as the temperature, pressure, and other aspects of the heat pressing step) to provide for substantial gelatinization of the starch in the dough.

It is noted that there is an inverse relationship between the heat pressing temperature and pressure to achieve the desired gelatinization and spread of the uncooked dough. For example, a hot plate that is used at higher temperatures will require lower pressure for achieving a similar degree of gelatinization and spread of the dough as compared to heat-pressing performed at lower temperatures, which would require higher pressure. In one example, heat-pressing uncooked dough having a thickness in the range of about 0.7 mm to about 3 mm, may be accomplished with a heat press temperature in the range of 250° F. to about 450° F. and a pressure range of about 15 psi to about 50 psi.

The thickness of the heat-pressed dough sheet will vary depending on the ultimate form factor desired for the food product. For example, in certain embodiments (e.g., for making snack chips or crisps), the thickness of the heat-pressed dough sheet is in the range of about 0.5 mm to about 3 mm. In other embodiments, the desired thickness of the heat-pressed dough sheet is in the range of about 0.7 mm to about 3 mm, 0.9 mm to about 1.5 mm, about 0.9 mm to about 2 mm, about 0.5 mm to about 1.5 mm, or about 1 mm to about 3 mm. As the person of ordinary skill in the art will appreciate, the heat pressing step can reduce the thickness of the dough. For example, when the uncooked dough is provided in sheet form, in certain embodiments, the thickness of the heat-pressed dough sheet is up to about 20% less than the thickness of the uncooked dough sheet (e.g., in the range of about 5% to about 20% less). This change in thickness can, for example, increase the surface area of the dough by an amount in the range of about 5% to about 20%. The decrease in thickness and increase in surface area will be a function of the moisture content of the dough, with wetter doughs becoming thinner and larger in surface area.

Of course, when the uncooked dough is provided in a thicker form (e.g., a ball or a thick piece in another shape), the heat pressing step can itself thin the dough to the desired thickness.

In further embodiments, the uncooked dough or heat-pressed dough sheet may be cut into a plurality of pieces (i.e., before heat pressing, after heat pressing, or both). These pieces may be formed into a variety of shapes and sizes, including, but not limited to, circles, squares, rectangles, and diamonds, among others. The dough may be cut by a series of thin, sharp surfaces such as knives or rollers that are mechanically driven or cut against the dough. Alternatively, the dough may be fed between a pair of rollers that together form depressed cavities. As the person of ordinary skill in the art will appreciate, a variety of other methods and mechanisms can be used to cut the dough into the desired shapes, either before, after, or concurrent with heat pressing.

In certain aspects of the disclosure, the dough may be dockered before entering the heat-press apparatus or following the heat-pressing step. Dockering (i.e., puncturing the dough surface with a plurality of small holes) can help to control excessive bubbling during the heat-pressing and cooking steps.

During the process of heat-pressing, the moisture level of the dough may decrease. For example, in certain embodiments, the moisture content of the dough decreases by an amount within the range of about 5% to about 20% (i.e., as calculated with respect to the moisture level of the uncooked dough). In certain embodiments, the moisture content of the dough decreases by an amount within the range of about 5% to about 15%, or about 10% to about 20%, or about 10% to about 15%. The loss of moisture can, for example, be accompanied by gelatinization of starch and alteration of the textured dough piece. This loss in moisture may also impact the characteristics of the uncooked dough as a result of the heat-pressing technique. Some changes that may occur include: the texture of the dough, the color of the dough, and the feel of the dough. For instance, in some embodiments, after the heat-pressing has occurred, the translucent color of the dough may become more opaque. Also, the dough may become significantly less sticky and easier to handle for further processing.

Once the uncooked dough is heat-pressed to form a heat-pressed dough sheet, such that starch gelatinization is at a desired level, the heat-pressed dough sheet is cooked such that the resulting food product has a moisture content of less than about 3%. For example, the dough sheet can be cooked to a moisture content of less than about 2.5%. Such a food product can be made, for example, to be crispy, and can therefore be suitable for enjoyment as a snack chip or cracker.

Cooking the heat-pressed dough sheet may be performed using any of a variety of techniques, including, but not limited to, baking and frying. Before cooking the heat-pressed dough sheet, it may be allowed to cooled, for example, to ambient temperature.

In certain embodiments of the invention as described herein, the dough sheet is baked (e.g., without being fried). Baking may occur in any form of an oven, including, but not limited to a convection oven. In certain embodiments, the baking is conducted in a forced air convection oven. In order to properly bake the heat-pressed dough sheet, the temperature and length of time may be adjusted. In some embodiments, the oven may include a fan speed which may also be adjusted. The temperature of the oven may range, for example, from about 250° F. to about 500° F., e.g., from about 300° F. to about 450° F., about 300° F. to about 500° F., about 350° F. to about 450° F., about 350° F. to about 500° F., about 300° F. to about 400° F., or about 350° F. to about 450° F. The baking time can vary depending, for example, on the baking temperature and the desired characteristics for the food product. For example, the baking time can vary from about 30 seconds to about 20 minutes, from about 1 minute to about 20 minutes, from about 2 minutes to about 20 minutes, from about 30 seconds to about 10 minutes, from about 30 seconds to about 5 minutes, from about 30 seconds to about 2 minutes, from about 1 minute to about 10 minutes, from about 1 minute to about 5 minutes, from about 1 minute to about 3 minutes, or from about 60 seconds to about 180 seconds in order to achieve a final moisture content of less than about 3%. Oil can be disposed on the surface of the dough sheet (or can be provided within the dough itself) before baking in order to provide a baked food product with fried character. Similarly, the baked food product can be sprayed or otherwise coated with oil after baking; salt and/or seasonings may be disposed on the surface of the baked food product as well.

In certain embodiments of the invention as described herein, the dough sheet is fried. Possible frying oils include, but are not limited to, peanut oil, vegetable oil, or canola oil, among others. As the person of ordinary skill in the art will appreciate, the temperature, type of oil, and length of the time the heat-pressed dough is fried may be adjusted according to the desired outcome. The temperature of the oil may be, for example, in the range of about 275° F. to about 450° F., e.g., about 275° F. to about 400° F., about 275° F. to about 350° F., about 300° F. to about 450° F., or about 350° F. to about 450° F. The length of time the heat-pressed dough is fried may range, for example, from about 30 seconds to about 3 minutes, from about 30 seconds to about 2 minutes, or from about 30 seconds to about 60 seconds. In one particular embodiment, a heat-pressed dough sheet based on corn masa is fried in a batch fryer for 30-60 seconds at a temperature of 345° F. to achieve a final moisture content of less than about 3%.

Advantageously, in certain embodiments of the invention as described herein, the process of heat-pressing and the resulting gelatinization may cause fat absorption to increase from about 5% to about 25% when compared with traditionally fried sheeted snacks that do not employ heat-pressing. This may be caused by the decrease in dough sheet thickness and the formation of bubbles. As such, typical fat content of flour-based food products that are heat-pressed and fried may be in the range of about 20% to about 35%.

In certain embodiments of the invention as described herein, the heat-pressed dough sheet is both baked and fried to provide a food product having a moisture content less than about 3%, or even less than about 2.5%. For example, the heat-pressed dough sheet may be partially baked (e.g., such that its moisture content remains above about 3%) then fried to provide a food product having a moisture content less than about 3%, or even less than about 2.5%. In such embodiments, the partially cooked dough sheet may or may not be cooled prior to entry into the fryer.

As the person of ordinary skill in the art will appreciate, once the heat-pressed dough sheet is cooked to provide the food product, it may be further seasoned or treated as is conventional in the art. For example, a food product in the form of a snack chip may be further topically seasoned with salt, spices and/or flavorings, sweet or savory, in order to enhance mouthfeel and flavor.

One particular example of a method for preparing a flour-based food product as described herein includes:

(a) Transferring dry ingredients in a bowl and mixing;
(b) Adding wet ingredients while mixing until fully combined to form an uncooked dough;
(c) Running the uncooked dough through a dough sheeter to provide an uncooked dough sheet having a desired thickness;
(d) Cutting the uncooked dough sheet into shaped dough pieces;
(e) Placing the shaped dough pieces between two hot plates that are maintained between 350° F. –400° F.;
(f) Pressing the hot plates together for a period of 1-3 seconds;
(g) Ejecting the heat-pressed dough sheet; and
(h) Cooking the heat-pressed dough sheet to form a food product that has a moisture content of less than about 3%.

The invention will be further described with reference to the following examples.

An uncooked dough of the following composition was prepared:

| Ingredient | Amount |
| --- | --- |
| Corn masa flour - coarse (Azteca Milling Co.) | 35.54% |
| Water (75-85° F.) | 35.53% |
| Dehydrated potato flakes | 12.11% |
| Corn masa flour - fine (Azteca Milling Co.) | 7.68% |
| X-PAND'R ® Food Starch - Modified (Tate & Lyle) | 4.80% |
| X-PAND'R ® SC ® Corn Starch (Tate & Lyle) | 2.94% |
| Sugar, granulated | 0.52% |
| Monocalcium phosphate, monohydrate | 0.29% |
| Lecithin, emulsifier, Centrolex F | 0.17% |
| Flour salt | 0.15% |
| Sodium bicarbonate | 0.15% |
| Corn oil | 0.12% |

To prepare the dough, all dry ingredients were transferred to a Hobart bowl and mixed for 30 seconds with a paddle at speed 1. The corn oil and water were added with mixing, then mixing was continued for three minutes. The resulting dough was collected in the form of a ball, which was run through a Rondo reversible dough sheeter multiple times to provide a dough sheet 1.3-1.4 mm in thickness. A pizza cutter was used to cut the dough sheet into triangular pieces. Individual dough sheet pieces were placed between the hot plates of a hand-operated heat press unit maintained at 350-400° F., and pressed for several seconds.

Figure 1:
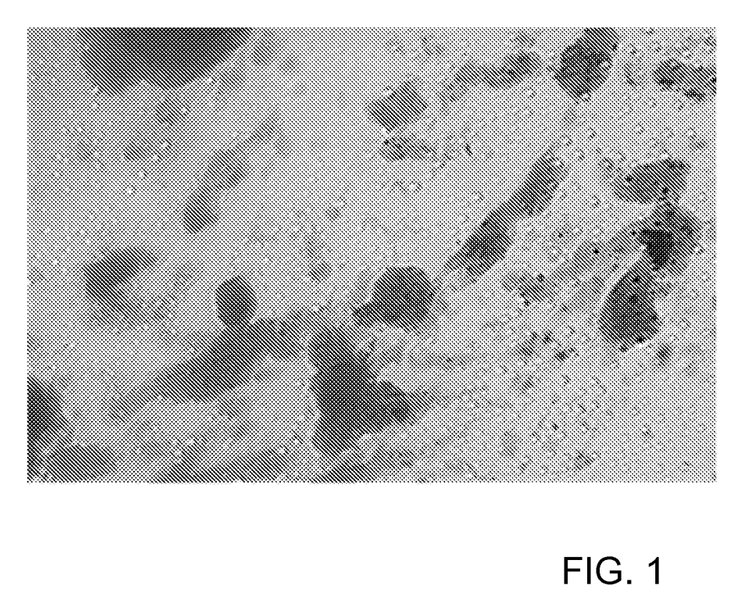
FIGS. 1 and 2 are micrographs of flour and starch granules in dough components of the Example formulation, before (FIG. 1) and after (FIG. 2) heat-pressing.
Figure 2:
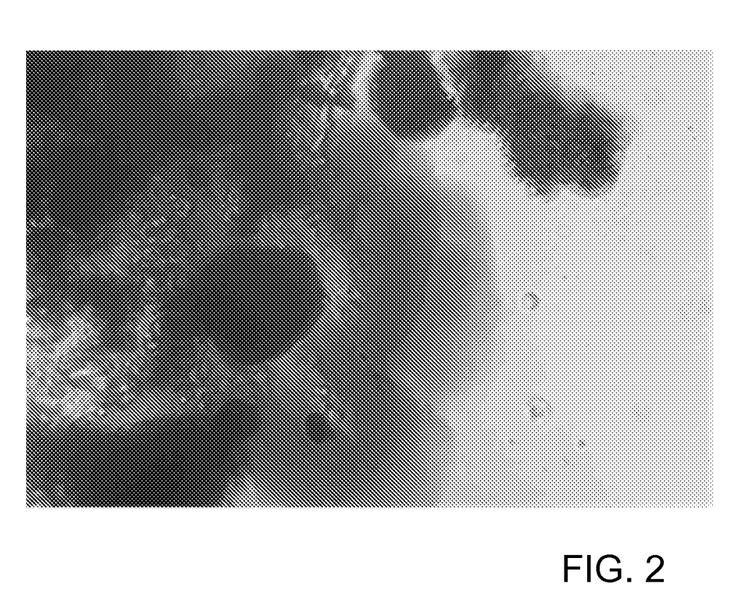

A comparison of the morphology of the dough sheet is shown in the micrographs of FIGS. 1 and 2. FIG. 1 is a micrograph at 50× magnification of the uncooked dough sheet, and FIG. 2 is a micrograph at 50× magnification of the heat-pressed dough sheet. Notably, the micrographs indicate an increase in swelling of starch granules from the corn masa, the dried potatoes and the starches. Without intending to be bound by theory, the inventors also note that protein denaturation is also taking place in addition to starch gelatinization. Transformation of starch granules and proteins of the dough components during heat pressing can contribute to texture development during further processing (e.g., baking and/or frying).

During heat pressing, the moisture of the dough sheet piece decreased from 35.97% to 31.35%. The heat pressing caused the dough pieces to change from translucent to slightly more opaque appearance. Heat pressed dough pieces became significantly less sticky and easier to handle for further processing.

The resulting heat-pressed dough sheet pieces were baked in a convection oven at 325° F. at high fan speed for two minutes, followed by complete cooling to ambient temperature, then fried in a batch fryer at 345° F. for 30-60 seconds to achieve less than 2.5% moisture. As a comparative example, uncooked dough sheet pieces were baked and fried as described above.

Figure 3:
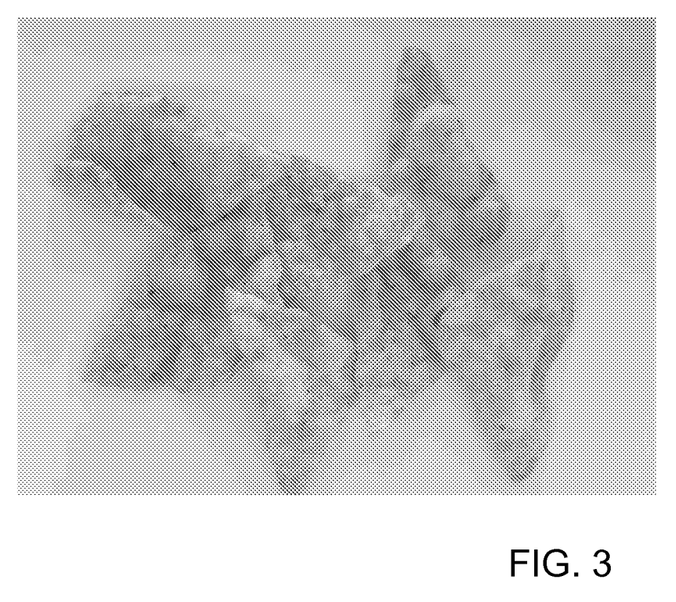
FIG. 3 is a picture of tortilla chips made as described herein, by heat-pressing then frying a corn masa and potato dough.
Figure 4:
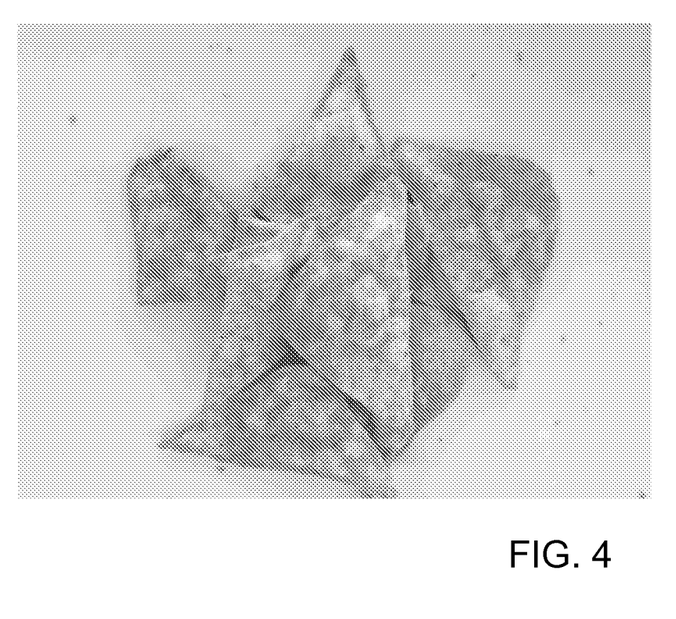
FIG. 4 is a picture of tortilla chips made as described herein, by heat-pressing, parbaking then frying a corn masa dough.
Figure 5:
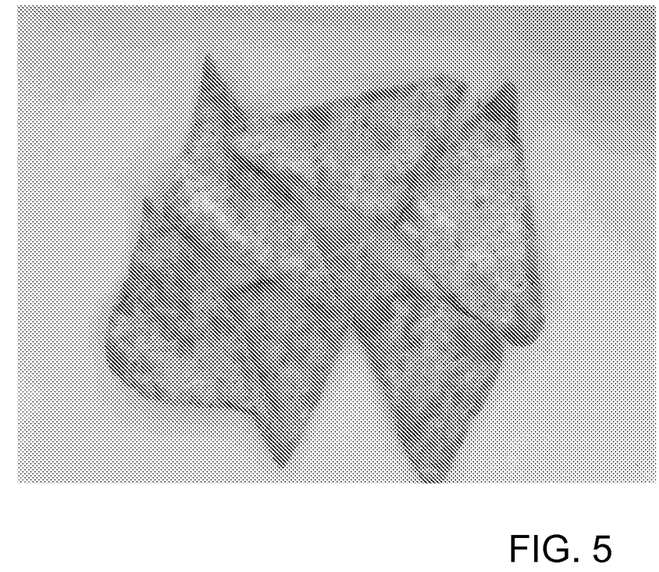
FIG. 5 is a picture of tortilla chips made as described herein, by heat-pressing then baking a corn masa dough.
Figure 6:
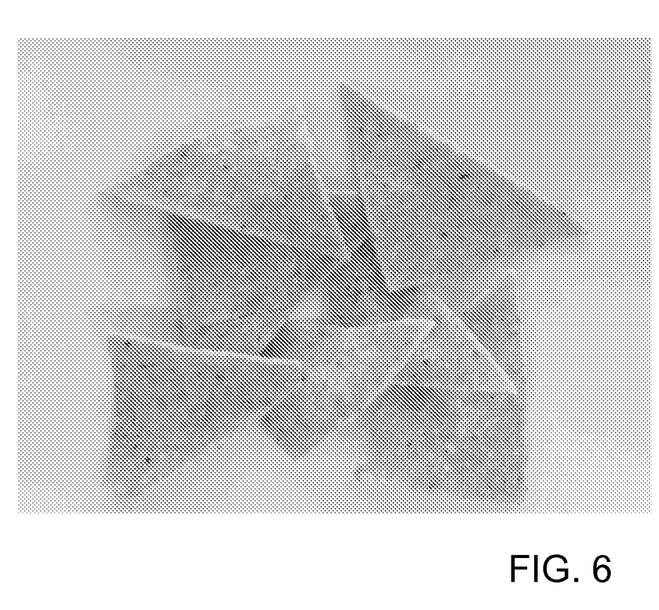
FIG. 6 is a picture of conventional tortilla chips, made by sheeting, parbaking and frying a corn masa dough.

The heat-pressed fried snack possessed a light, bubbly and crisp texture with rapid mouth melt. In contrast, the fried snacks made without heat pressing had a dense, hard and crunchy texture without a bubbly appearance. FIGS. 3-6 demonstrate the effect of heat pressing on various corn-based snacks FIG. 3 is a picture of a tortilla chip made as described herein, by heat-pressing then frying a corn masa and potato dough, and FIG. 4 is picture of a tortilla chip made as described herein, by heat-pressing then frying a corn masa dough. Both of these fried samples had a light, bubbly and crisp texture. FIG. 5 is a picture of a tortilla chip made as described herein, by heat-pressing then baking a corn masa dough. This chip is less bubbly than the fried chips of FIGS. 3 and 4, but nonetheless had a light texture. The chips in FIGS. 3-5 were dusted with a seasoning mixture. FIG. 6 is a picture of a conventional tortilla chip, made by sheeting, parbaking and frying the same corn masa dough as used in the chips of FIG. 4. These chips, made without heat pressing, had a dense, hard and crunchy texture without a bubbly appearance, thus demonstrating the advantages of heat-pressing.

We claim:

1. A method for making a food product in the form of a chip, crisp or cracker, the method comprising:
   providing a sheet of an uncooked dough having an exposed first surface and an exposed opposing second surface, and a thickness extending between the first surface and the opposing second surface in the range of about 0.5 to 3 mm, the uncooked dough comprising:
   about 20% to about 60% flour;
   about 2% to about 15% starch; and
   about 20% to about 60% water;
   heat-pressing the sheet of uncooked dough, wherein the heat-pressing is conducted by pressing the uncooked dough between two heated plates at a pressure from about 15 psi to about 50 psi and at a plate temperature in the range of about 250° F. to about 500° F., or by feeding the uncooked dough through a plurality of heated rollers at a pressure from about 15 psi to about 50 psi and at a roller temperature in the range of about 250° F. to about 500° F., such that one of the heated rollers or plates contacts the first surface of the sheet of uncooked dough and another of the heated rollers or plates contacts the second opposing surface of the sheet of uncooked dough, to substantially gelatinize the starch of the dough, to form a heat-pressed dough sheet having an exposed first surface and an exposed opposing second surface and having a thickness in the range of about 0.5 mm to about 3 mm; and then
   cooking the heat-pressed dough sheet having the exposed first surface and an exposed opposing second surface to form the food product in the form of the chip, crisp or cracker, the food product having a moisture content of less than about 3%.

2. The method of claim 1, wherein the flour comprises corn masa flour.

3. The method of claim 1, wherein
   the flour is present in the uncooked dough in an amount within the range of about 25% to about 45%; and
   the water is present in the uncooked dough in the range of about 25% to about 50%.

4. The method of claim 1, wherein at least part of the flour in the uncooked dough is not gelatinized.

5. The method of claim 1, wherein at least part of the flour in the uncooked dough is only partially gelatinized.

6. The method of claim 1, wherein the starch in the uncooked dough comprises one or more starches selected from the group consisting of a native starch, a modified starch, and a cook-up starch.

7. The method of claim 1, wherein the uncooked dough further comprises a bean material, a lentil material, a whole grain material, a bran material, a vegetable material, or a potato material, in an amount up to about 30%.

8. The method of claim 1, wherein the uncooked dough further comprises about 0.05% to about 2% of an emulsifier.

9. The method of claim 1, wherein the uncooked dough further comprises about 0.01% to about 2% of a leavening agent.

10. The method of claim 1, wherein the uncooked dough further comprises about 1% to about 5% of a particulate having a size in the range of about 300 micrometers to 1800 micrometers.

11. The method of claim 10, wherein the particulate comprises corn meal, rice meal, or seminola.

12. The method of claim 1, wherein the heat-pressing is conducted at a temperature in the range of about 350° F. to 400° F.

13. The method of claim 1, wherein the heat-pressing is conducted by feeding the uncooked dough through a plurality of heated rollers at a roller temperature in the range of about 250° F. to about 500° F.

14. The method of claim 1, wherein the heat-pressing is conducted by pressing the uncooked dough between two heated plates at a plate temperature in the range of about 250° F. to about 500° F.

15. The method of claim 1, wherein in the heat-pressing, the dough is heat-pressed for a time in the range of about 0.1 to about 10 seconds.

16. The method of claim 1, wherein the heat-pressing does not reduce the thickness of the dough sheet by more than 20%.

17. The method of claim 1, wherein the uncooked dough sheet is cut into a plurality of pieces before the heat-pressing.

18. The method of claim 1, wherein the heat-pressed dough sheet is cooled before it is cooked.

19. The method of claim 1, wherein the cooking comprises baking the heat-pressed dough sheet.

20. The method of claim 19, wherein the cooking further comprises, after baking the heat-pressed dough sheet, frying the heat-pressed dough sheet.

21. The method of claim 1, wherein the heat-pressing is conducted at a temperature in the range of about 250° F. to about 450° F.

22. The method of claim 1, wherein
   the flour is present in the uncooked dough in an amount within the range of about 25% to about 45%; and
   the water is present in the uncooked dough in the range of about 25% to about 50%;
   wherein
   in the heat-pressing, the dough is heat-pressed for a time in the range of about 0.1 to about 10 seconds, and
   the heat-pressing does not reduce the thickness of the dough sheet by more than 20%.

23. The method of claim 1, wherein the cooking comprises frying the heat-pressed dough sheet.

24. The method of claim 1, wherein the food product is in the form of a chip or crisp.

25. The method of claim 1, wherein the cooking comprises baking but not frying the heat-pressed dough sheet.

\* \* \* \* \*